(12) United States Patent
Kossmann et al.

(10) Patent No.: US 12,141,117 B2
(45) Date of Patent: Nov. 12, 2024

(54) TRAINING AN AGENT FOR ITERATIVE MULTI-ATTRIBUTE INDEX SELECTION

(71) Applicant: Hasso-Plattner-Institut für Digital Engineering gGmbH, Potsdam (DE)

(72) Inventors: Jan Kossmann, Berlin (DE); Rainer Schlosser, Berlin (DE); Alexander Kastius, Potsdam (DE); Michael Perscheid, Potsdam (DE); Hasso Plattner, Schriesheim (DE)

(73) Assignee: Hasso-Plattner-Institut für Digital Engineering gGmbH, Potsdam (DE)

( * ) Notice: Subject to any disclaimer, the term of this patent is extended or adjusted under 35 U.S.C. 154(b) by 0 days.

(21) Appl. No.: 18/167,667

(22) Filed: Feb. 10, 2023

(65) Prior Publication Data
US 2023/0315709 A1    Oct. 5, 2023

(30) Foreign Application Priority Data
Feb. 11, 2022    (EP) .................................... 22156399

(51) Int. Cl.
*G06F 16/22* (2019.01)
*G06F 16/2453* (2019.01)

(52) U.S. Cl.
CPC .... *G06F 16/2272* (2019.01); *G06F 16/24542* (2019.01)

(58) Field of Classification Search
CPC .................. G06F 16/2272; G06F 16/24542
See application file for complete search history.

(56) References Cited

U.S. PATENT DOCUMENTS

| | | | | |
|---|---|---|---|---|
| 5,913,206 A | * | 6/1999 | Chaudhuri | G06F 16/22 707/999.005 |
| 6,266,658 B1 | * | 7/2001 | Adya | G06F 16/22 707/999.005 |
| 2003/0088541 A1 | * | 5/2003 | Zilio | G06F 16/22 |
| 2005/0187917 A1 | | 8/2005 | Lawande et al. | |
| 2007/0067261 A1 | * | 3/2007 | Burger | G06F 16/2272 |
| 2010/0174701 A1 | * | 7/2010 | Burger | G06F 16/2264 707/E17.057 |
| 2013/0263117 A1 | | 10/2013 | Konik et al. | |
| 2020/0241921 A1 | | 7/2020 | Calmon et al. | |
| 2020/0320070 A1 | | 10/2020 | Schlosser et al. | |
| 2021/0034588 A1 | * | 2/2021 | Burger | G06N 3/08 |
| 2021/0357406 A1 | * | 11/2021 | Potharaju | G06F 16/2471 |

OTHER PUBLICATIONS

Extended European Search Report, E22156399.2, dated May 17, 2022, 11 pages.
Lai Sichao, et al: "Learning an Index Advisor with Deep Reinforcement Learning", Aug. 19, 2021, Computer Vision—ECCV 2020, pp. 178-185.

(Continued)

*Primary Examiner* — James E Richardson
(74) *Attorney, Agent, or Firm* — Fountainhead Law Group, PC

(57) ABSTRACT

Embodiments relate to a method for training an index selection agent for iteratively determining an index set I to be used when running queries against a database, the method being implemented in a computer system. Preferably, the index selection agent is based on Reinforcement Learning.

20 Claims, 6 Drawing Sheets

(56) References Cited

OTHER PUBLICATIONS

Sadri, Zahra, et al: "DRLindex : Deep Reinforcement Learning Index Advisor for a Cluster Database", Proceedings of the 24th Symposium on International Database Engineering & Applications, Aug. 12, 2020 (Aug. 12, 2020), pp. 1-8.

Lan Hai, et al., "An Index Advisor Using Deep Reinforcement Learning", C1KM '20, Oct. 19-23, 2020, Virtual Event, Ireland, pp. 1-4.

Gibas Michael, et al., "Online Index Recommendations for High-Dimensional Databases Using Query Workloads", IEEE Transactions on Knowledge and Data Engineering, vol. 20, No. 2, Feb. 2008, 15 pages.

Ankur Sharma, et al., "The Case for Automatic Database Administration using Deep Reinforcement Learning", Jan. 17, 2018; 9 pages.

Ingo Müller, et al., "Cache-Efficient Aggregation: Hashing Is Sorting". In Proceedings of the International Conference on Management of Data (SIGMOD), 5 pages, (2015).

Licks et al., "SMARTIX: A database indexing agent based on reinforcement learning", 14 pages, Published online Mar. 14, 2020.

Gary Valentin et al., DB2 advisor: an Optimizer Smart Enough to Recommend Its Own Indexes, Proceedings of 16th International Conference on Data Engineering (Cat. No.00CB37073), San Diego, CA, USA, 2000, pp. 10.

Jan Kossmann et al., "Magic mirror in my hand, which is the best in the land? An Experimental Evaluation of Index Selection Algorithms", PVLDB 13, 11 (2020), 2382-2395.

Markus Dreseler et al., "Quantifying TPC-H Choke Points and Their Optimizations", PVLDB 13, 8, pp. 1206-1220 (2020).

Nicolas Bruno et al., "Automatic Physical Database Tuning: A Relaxation-based Approach". In Proceedings of the International Conference on Management of Data (SIGMOD). 227-238 (2005).

Rainer Schlosser et al., "Efficient Scalable Multi-Attribute Index Selection Using Recursive Strategies". In Proceedings of the International Conference on Data Engineering (ICDE). 1238-1249 (2019).

Stratos Idreos et al., "Database Cracking". In Proceedings of the Conference on Innovative Data Systems Research (CIDR). 68-78 (2007).

Stratos Idreos et al,. "Merging What's Cracked, Cracking What's Merged: Adaptive Indexing in Main-Memory Column-Store". PVLDB 4, 9, 585-597 (2011).

Surajit Chaudhuri et al., "An Efficient Cost-Driven Index Selection Tool for Microsoft SQL Server". In Proceedings of the International Conference on Very Large Databases (VLDB), 146-155 (1997).

Vincent Y. Lum et al., An Optimization Problem on the Selection of Secondary Keys. In Proceedings of the 1971 26th Annual Conference (ACM 1971). 349-356.

Yu Yan et al., "Index selection for NoSQL database with deep reinforcement learning". Information Sciences 561 pp. 20-30 (2021).

John Schulman et al,. "Proximal Policy Optimization Algorithms", 12 pages, (Aug. 28, 2017).

Surajit Chaudhuri et al., "Compressing SQL workloads". In Proceedings of the International Conference on Management of Data (SIGMOD), pp. 488-499 (2002).

Shaleen Deep et al., "Comprehensive and Efficient Workload Compression". PVLDB 14, 3, pp. 418-430 (2020).

Lin Ma et al., "Query-based Workload Forecasting for Self-Driving Database Management Systems". In Proceedings of the International Conference on Management of Data (SIGMOD), pp. 631-645 (2018).

Kyu-Young Whang, "Index Selection in Relational Databases". In Proceedings of the International Conference on Foundations of Data Organization (FoDO), pp. 487-500 (1985).

Zahra Sadr et al., "Online Index Selection Using Deep Reinforcement Learning for a Cluster Database". In Proceedings of the International Conference on Data Engineering (ICDEW) Workshops, pp. 158-161 (2020).

\* cited by examiner

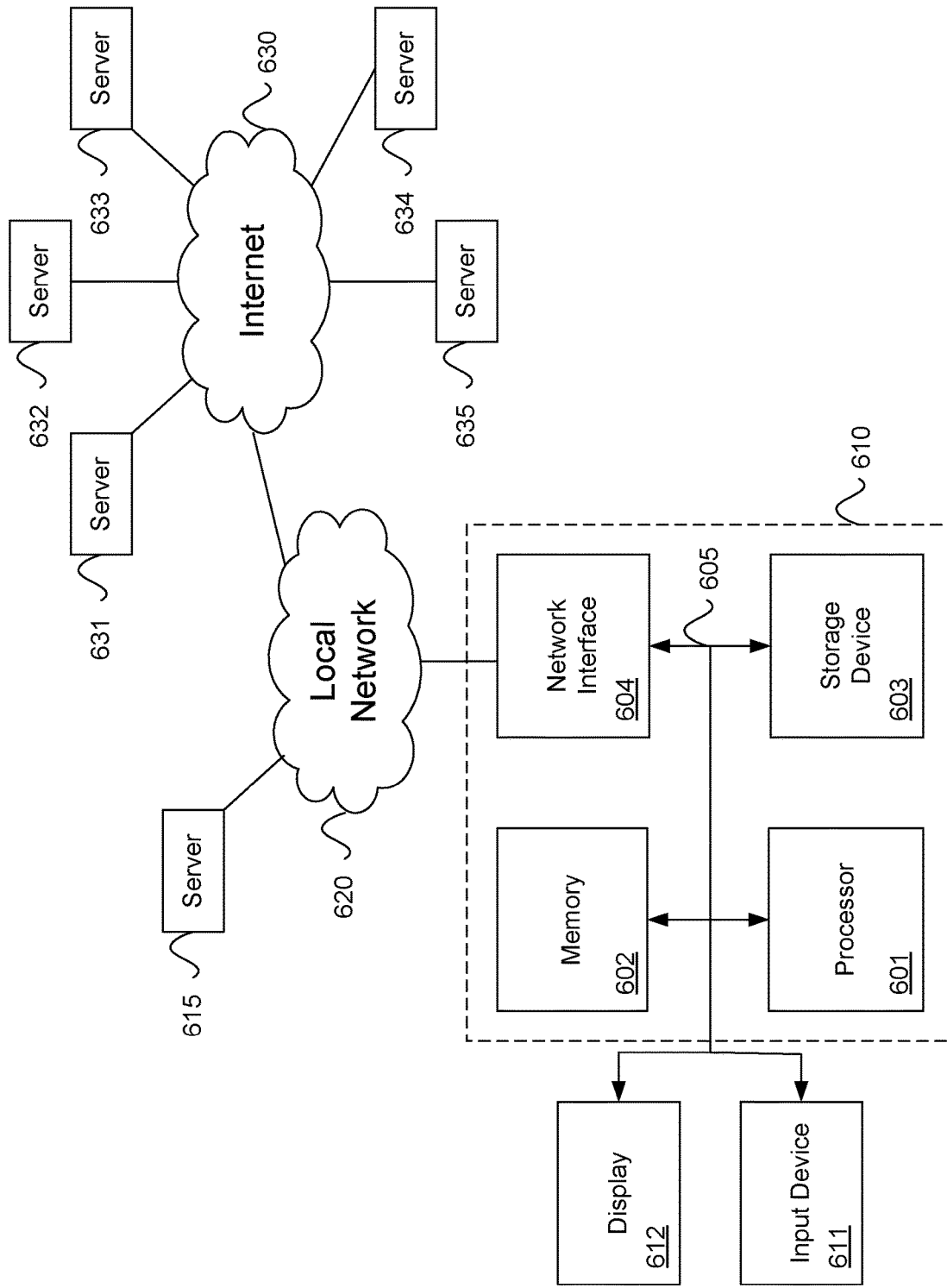

TRAINING AN AGENT FOR ITERATIVE MULTI-ATTRIBUTE INDEX SELECTION

CROSS-REFERENCE TO RELATED APPLICATIONS

This disclosure claims priority to European Application No. EP 22 156 399.2 filed Feb. 11, 2022 for "Training an Agent for iterative Multi-Attribute Index Selection", which is incorporated herein by reference.

BACKGROUND TO THE INVENTION

Embodiments relate to database systems, in particular, to index selection for a database system. Embodiments further relate to reinforcement learning applied to said index selection.

Large database instances handling highly concurrent workloads require secondary indexes to avoid sequential scans, save memory bandwidth, and thereby achieve acceptable latencies and throughput.

Indexes trade increased performance for additional storage, typically a scarce resource in database systems. This emphasizes the need for mechanisms to efficiently balance storage consumption and performance gain.

Secondary indexes are indispensable for the performance of relational database systems. Determining the right set of indexes is a challenging process that has been researched for the past 50 years. There are various sophisticated index selection approaches. For complex workloads, however, current approaches produce either solutions of high quality or provide low index selection runtimes. Yet they fall short of striking the right balance between both (and further) metrics, e.g., Extend and DB2Advis.

By 2022, more than 75% of all databases are estimated to run in the cloud. The increasing share of database deployments in cloud environments, especially in Software-as-a-Service (SaaS) scenarios, shifts the responsibility for effective physical database design to cloud vendors that maintain these systems. This development and the cloud's promise to reduce the total cost of ownership allow for reconsidering how physical database design challenges are approached. The sheer number of systems to be maintained and dynamically changing workloads, which demand fast reactions by reconfigurations, require that optimized configurations can be determined quickly and efficiently. This applies particularly to the selection of indices.

There is a multitude of existing index selection algorithms, the first dating back to 1971 [Vincent Y. Lum and Huei Ling. 1971. An Optimization Problem on the Selection of Secondary Keys. In Proceedings of the 1971 26th Annual Conference (ACM '71). 349-356]. Most techniques either iteratively add indexes to an empty start configuration or reduce a comprehensive start configuration step by step. Reductive approaches [Nicolas Bruno and Surajit Chaudhuri. 2005. Automatic Physical Database Tuning: A Relaxation-based Approach. In Proceedings of the International Conference on Management of Data (SIGMOD). 227-238; and Kyu-Young Whang. 1985. Index Selection in Relational Databases. In Proceedings of the International Conference on Foundations of Data Organization (FoDO). 487-500] often result in very long runtimes because many iterations are necessary to comply with the specified constraints [January Kossmann, Stefan Halfpap, Marcel Jankrift, and Rainer Schlosser. 2020. Magic mirror in my hand, which is the best in the land? An Experimental Evaluation of Index Selection Algorithms. PVLDB 13, 11 (2020), 2382-2395]. There are three additive algorithms that showed either the fastest runtimes or were able to determine the best (or even optimal) solutions during a recent experimental evaluation study [ibid]: AutoAdmin by Chaudhuri and Narasayya [Surajit Chaudhuri and Vivek R. Narasayya. 1997. An Efficient Cost-Driven Index Selection Tool for Microsoft SQL Server. In Proceedings of the International Conference on Very Large Databases (VLDB). 146-155], DB2Advis by Valentin et al. [Gary Valentin, Michael Zuliani, Daniel C. Zilio, Guy M. Lohman, and Alan Skelley. 2000. DB2 Advisor: An Optimizer Smart Enough to Recommend Its Own Indexes. In Proceedings of the International Conference on Data Engineering (ICDE). 101-110. <//doi.org/10.1109/ICDE.2000.839397>], and Extend by Schlosser et al. [Rainer Schlosser, Jan Kossmann, and Martin Boissier. 2019. Efficient Scalable Multi-Attribute Index Selection Using Recursive Strategies. In Proceedings of the International Conference on Data Engineering (ICDE). 1238-1249]. None of the existing approaches, however, achieves both performance criteria high quality and fast solutions for complex analytical workloads. Other techniques involve adaptive indexing [Stratos Idreos, Stefan Manegold, Harumi A. Kuno, and Goetz Graefe. 2011. Merging What's Cracked, Cracking What's Merged: Adaptive Indexing in Main-Memory Column-Stores. PVLDB 4, 9 (2011), 585-597] or database cracking [Stratos Idreos, Martin L. Kersten, and Stefan Manegold. 2007. Database Cracking. In Proceedings of the Conference on Innovative Data Systems Research (CIDR). 68-78]. But these techniques are limited to column stores.

Lately, RL-based index selection approaches have been presented as an alternative to existing rule and enumeration-based heuristics. These RL approaches show promising results but also have limitations. Sharma et al. were the first to present an RL-based index selection approach, NoDBA, capable of creating single-attribute indexes in 2018 [Ankur Sharma, Felix Martin Schuhknecht, and Jens Dittrich. 2018. The Case for Automatic Database Administration using Deep Reinforcement Learning. CoRR abs/1801.05643 (2018)]. They evaluate their ideas with queries that filter TPCH's LINEITEM table on multiple attributes. The model represents the workload as a matrix that contains the selectivity of every attribute for every query if the query is filtered on this attribute. Generalization to unknown queries is not treated. Varying frequencies of the queries are not considered and, based on the approach, seem unfeasible for larger workload sizes. This approach does not consider other operators (apart from selection predicates) for index selection, which is a significant limitation as other operators, e.g., joins and aggregates, are responsible for a large amount of the overall runtime in typical database workloads [Markus Dreseler, Martin Boissier, Tilmann Rabl, and Matthias Uflacker. 2020. Quantifying TPC-H Choke Points and Their Optimizations. PVLDB 13, 8 (2020), 1206-1220., Ingo Müller, Peter Sanders, Arnaud Lacurie, Wolfgang Lehner, and Franz Färber. 2015. Cache-Efficient Aggregation: Hashing Is Sorting. In Proceedings of the International Conference on Management of Data (SIGMOD). 1123-1136].

Sadri et al. present DRLinda for cluster databases [Zahra Sadri, Le Gruenwald, and Eleazar Leal. 2020. DRLindex: deep reinforcement learning index advisor for a cluster database. In Proceedings of the International Database Engineering and Applications Symposium (IDEAS). 11:1-11:8., Zahra Sadri, Le Gruenwald, and Eleazar Leal. 2020. Online Index Selection Using Deep Reinforcement Learning for a Cluster Database. In Proceedings of the International Conference on Data Engineering (ICDE) Workshops. 158-161].

Multi-attribute indexes are not supported. Rather, a focus is set to multiple instances in a database cluster. The workload is represented in three ways: (i) an access matrix that encodes for every attribute whether or not it is accessed in a query, (ii) an access vector that counts how often every attribute is accessed in total, and (iii) a selectivity vector that holds selectivity=#unique values for each attribute. Generalization to unknown workloads is not disclosed.

Lan et al. propose another RL-based solution that allows identifying multi-attribute indexes [Hai Lan, Zhifeng Bao, and Yuwei Peng. 2020. An Index Advisor Using Deep Reinforcement Learning. In Proceedings of the International Conference on Information and Knowledge Management (CIKM). 2105-2108]. With increasing index widths (W), the number of candidates increases drastically; for workloads with hundreds of attributes, thousands of relevant 3-attribute indexes exist [January Kossmann, Stefan Halfpap, Marcel Jankrift, and Rainer Schlosser. 2020. Magic mirror in my hand, which is the best in the land? An Experimental Evaluation of Index Selection Algorithms. PVLDB 13, 11 (2020), 2382-2395]. The set of available actions usually comprises one action per index candidate for RL-based approaches. The authors propose five heuristic rules that serve as a preselection to reduce the number of index candidates (and consequently actions) and enable the selection of multi-attribute indexes. Excluding index candidates in advance decreases the potential solution quality [Rainer Schlosser, Jan Kossmann, and Martin Boissier. 2019. Efficient Scalable Multi-Attribute Index Selection Using Recursive Strategies. In Proceedings of the International Conference on Data Engineering (ICDE). 1238-1249]. This approach does not represent the workload with a low dimensional representation. For this reason, it cannot generalize to unknown workloads.

Licks et al. present SMARTIX: A database indexing agent based on reinforcement learning [Gabriel Paludo Licks, Júlia Mara Colleoni Couto, Priscilla de Fátima Miehe, Renata De Paris, Duncan Dubugras A. Ruiz, and Felipe Meneguzzi. 2020. SmartIX: A database indexing agent based on reinforcement learning. Applied Intelligence 50, 8 (2020), 2575-2588]. This implementation is not capable of creating multi-attribute indexes and does not include workload representation. In consequence, generalization to unknown workloads is not possible. Its training procedure trades off long trainings (multiple days) against avoiding inaccuracies of cost estimations: SMARTIX derives query runtimes from actual query executions and not on what-if based estimations, which makes training very expensive.

Yan et al. target NoSQL databases with DRLISA [Yu Yan, Shun Yao, Hongzhi Wang, and Meng Gao. 2021. Index selection for NoSQL database with deep reinforcement learning. Information Sciences 561 (2021), 20-30]. This approach stops training when no further performance improvement can be realized. This approach is based on a workload representation. But it is not disclosed how this workload representation is implemented. Hence it is unclear whether generalization to unknown is possible or not.

Object of Embodiments

One object of embodiments is to provide improved index selection methods and apparatuses.

Preferably, an object of an embodiment is to provide an index selection method that obtains index selection results that are competitive with the solutions of the best algorithms currently available, such as AutoAdmin or Extend, but computationally faster, for instance, comparable to the computation times of DB2Advis. At the same time, the training duration of the proposed model should not outweigh the advantage gained during application time.

Further preferably, an object of an embodiment is to provide support for multi-attribute indexes.

Further preferably, an object of an embodiment is to provide support for storage budgets as a stop criterion for index selection. This allows more fine-grained solutions as compared to stop criteria targeting, for example, a predetermined number of indexes.

Further preferably, an object of an embodiment is to provide an index selection method that is able to generalize to unknown workloads.

SUMMARY

This object is solved by the method, the computer system and the computer program as set forth in the independent claims. The dependent claims are directed toward preferred embodiments.

The subject matter set forth in the claims takes the inner workings of the database computer system into account and provides a further technical effect.

BRIEF DESCRIPTION OF THE FIGURES

FIG. 6 is a block diagram of an example computer system and network for implementing embodiments.

DETAILED DESCRIPTION

Figure 1:
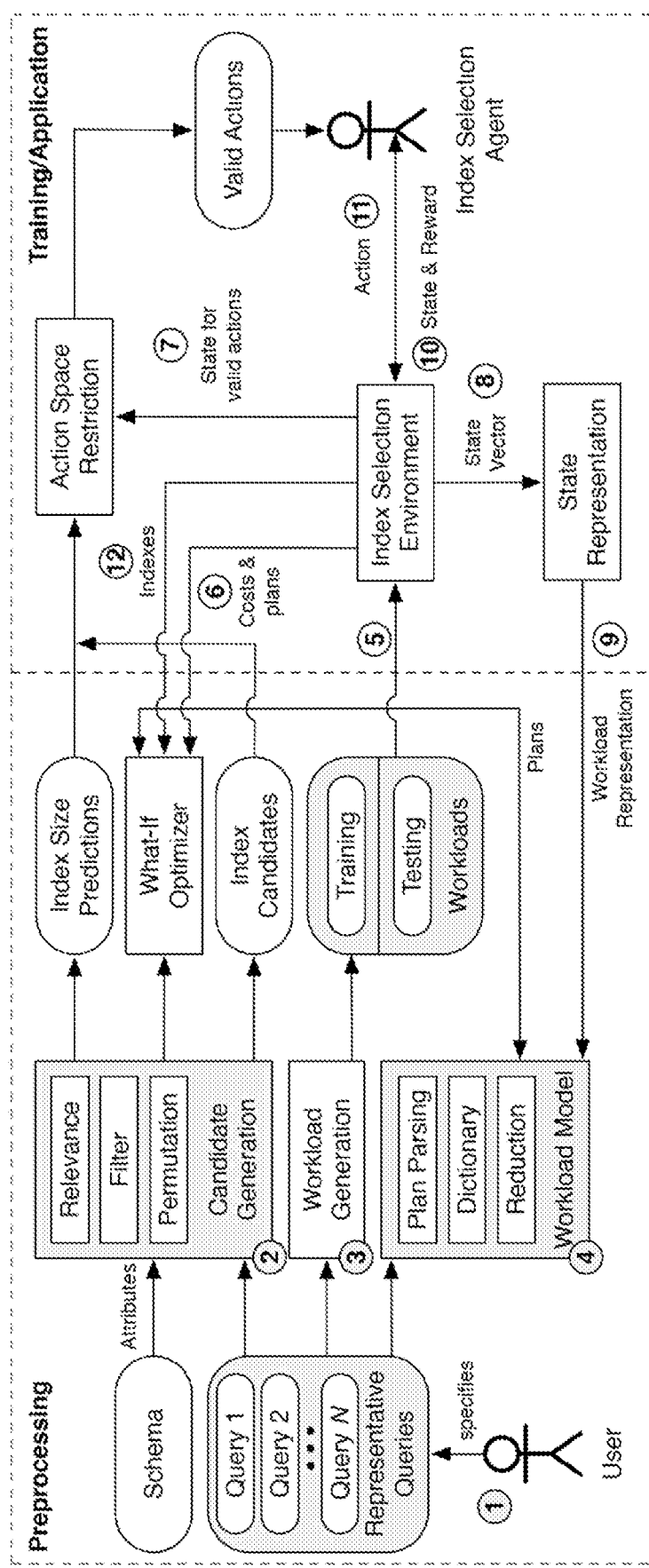
FIG. 1 depicts an architectural overview of the entities involved in the index selection method according to a preferred embodiment.

Before embodiments are described in detail, more formal explanations of the index selection problem and of reinforcement learning are given.

Index Selection Problem

Index selection describes the process of determining an optimal set of indexes for a workload. A "workload" is a set of queries that are run against the database with assigned frequencies. For instance, some queries of the set may be run against the database more often than other frequencies. Oftentimes certain constraints apply, such as a storage budget for the indexes. Several factors make index selection a challenging problem.

Large solution space: For reasonably sized datasets and workloads, numerous options for indexation, i.e., index candidates, exist. The number of relevant index candidates depends on the number of attributes (real-world datasets can contain tens of thousands of attributes) accessed by the workload's queries and the maximal number of attributes per index (multi-attribute candidates are typically generated by permuting single-attribute candidates). Evaluating all candidate combinations is, in general, impractical as their number exceeds the number of attributes by orders of magnitude. Hence, in practice, enumerating all solutions is infeasible.

Index interaction: During index selection, the candidates cannot be considered independent because indexes interact: the existence of one index can affect the performance impact of another index. Thus, during every step of an index selection process, the currently existing indexes have to be taken into account. This fact requires frequent recomputations of the candidates' benefits because every index creation or removal might drastically impact another index candidate's potential benefit.

Quantifying index impact: Determining the potential performance impact of index candidates is essential for comparing them and choosing the most promising ones. Physically creating indexes and measuring their impact is theoretically possible, but long creation and execution times render this method infeasible. For this reason, index selection approaches typically rely on estimates instead of actual measurements. Some database systems offer hypothetical indexes that are not (entirely) physically created but only inexpensively simulated for such estimations. These hypothetical indexes are considered by the DBMS' optimizer (what-if optimization) to generate query plans and cost estimations.

Despite the relatively cheap simulation of hypothetical indexes, the cost estimation process is still a major contributor to the runtime of index selection algorithms. While cost estimations may differ from actual execution costs to a large extent, they are typically the only feasible option for large workloads and still allow for comparing different index selection approaches.

Consider a workload characterized by N query templates (or query classes) and K involved attributes. Each query class n is represented by a set of attributes $q_n \subseteq \{1, \ldots, K\}$, $n=1, \ldots, N$, that are accessed. Further, by I, a given set of index candidates is denoted. An index $i \in I$ is characterized by an ordered set of attributes from $1, \ldots, K$. The width W of an index corresponds to the number of attributes it contains. $W_{max}$ denotes the largest index width considered during index selection. The required storage of index i is denoted by $m_i$, $i \in I$. A selection of indexes is denoted by the subset $I^* \subseteq I$. The costs to execute a query of class n depend on the chosen selection of indexes I' and are denoted by parameters $c_n(I^*)$. Assuming that queries of class n occur with frequencies $f_n$, $n=1, \ldots, N$, the total workload costs C depend on $I^*$ and amount to $$C(I^*) = \Sigma_{n=1,\ldots,N} f_n \cdot c_n(I^*). \quad (1)$$

The goal is to determine an index selection $I^* \subseteq I$ such that $C(I^*)$ is minimized or at least reduced significantly and a given storage budget B (stop criterion) is not exceeded. Using binary variables $x_i$, which indicate whether a candidate index $i \in I$ is part of the selection $I^*$ (1 yes, 0 no), we obtain numerous options for indexation, i.e., $$I^*(\vec{x}) := \cup_{i \in I: x_i=1} \{i\}$$

the total storage used by a selection $I^* = I^*(x)$ amounts to $$M(I^*(\vec{x})) := \Sigma_{i \in I} m_i \cdot x_i$$

and the index selection problem can be mathematically defined by:

$$\underset{x_i \in \{0,1\}, i \in I}{\text{minimize}} \ C(I^*(\vec{x})) \text{ subject to } M(I^*(\vec{x})) \le B. \quad (2)$$

Reinforcement Learning

Reinforcement Learning (RL) covers a group of algorithms to solve decision problems. Details can be taken from text books such as the second edition of "Reinforcement Learning" by Richard S. Sutton and Andrew G. Barto.

Those decision problems are characterized by processes that repeatedly allow an agent to perform an action $a_t$ of his available actions A given a current state $s_t \in S$. The state describes the properties of the environment the agent is currently observing. Depending on the problem and the RL algorithm, A and S can be either discrete or continuous and have an arbitrary number of dimensions. After performing the chosen action, a new state $s_{t+1}$ is reached and the process repeats. To provide agents with feedback on whether the action was chosen well, they receive a feedback signal, the reward $r_t$. The reward may be received after each decision. Alternatively, it can also be received sparsely. The simulation might end at some point, leading to episodes of finite length characterized by the states, the agent's decisions, and the rewards obtained. The RL problem consists of finding the optimal policy that maps states to actions in view of the discounted future long-term reward given a specific starting state at time t:

$$G_t = \Sigma_{k \ge 0} \gamma^k \cdot r_{t+k}. \quad (3)$$

The long-term reward is discounted to take into account that further progression in the decision process becomes less predictable. Low values of the discount factor $\gamma \in [0, 1]$ motivate the agent to act more greedily and consider possible long term rewards less.

To implement an RL system, the agent estimates the best expected value of $G_t$. The Q-value is the expected value of $G_t$ given a certain state $s_t$ and the chosen action $a_t$, i.e., $$Q(s,a) = E[G_t | s_t = s, a_t = a]. \quad (4)$$

The Q-value, as specified in (4) can be reformulated iteratively, as it incorporates the Q-value of the following state and its long term reward, $G_{t+1}$. This allows to learn an estimator for the Q-value using the Bellman-update, given an observed state s, a performed action $a_t$, the observed reward $r_t$, and the follow-up state $s_{t+1}$:

$$Q(s_t, a_t) \leftarrow Q(s_t, a_t) + \eta \cdot \left( r_t + \max_{a_{t+1} \in A} Q(s_{t+1}, a_{t+1}) - Q(s_t, a_t) \right),$$

where $\eta \in [0, 1]$ is the learning rate. Higher $\eta$ values increase the update size but decrease the stability of the estimation. In this setup, the agent keeps a matrix to store and update the Q-value for each observed combination of $s_t$ and a. This representation allows it to derive a policy from the Q-estimation, by greedily choosing the action a that maximizes (s,a) in the current state s. Actions are randomly chosen with a specified probability $\epsilon$ to ensure that the agent does not always choose the same actions (and leaves beneficial states unobserved). Further, instead of using tabular Q-values, a generic function approximator, such as an artificial neural network (ANN), can represent Q. In this setup, the difference between the network's estimation for the Q-value and the computed target value $$r_t + \max_{a_{t+1} \in A} Q(s_{t+1}, a_{t+1})$$

is minimized at each learning step.

This concept can be further expanded with policy gradient methods, which do not derive a policy from the learned value estimations but instead keep a parametric policy $a_t = \pi_\Phi(s_t)$. By adjusting $\Phi$, the mapping from $s_t$ to $a_t$ is changed. Adjusting $\Phi$ usually relies on the policy gradient theorem, which allows to improve expected rewards via $\Phi$ only based on past observations.

Preferred Embodiment of a Method and a Computer System for Training an Index Selection Agent A first aspect of embodiments described herein relates to a method for training an index selection agent for iteratively determining an index set I to be used when running queries against a database, the method being implemented in a computer system with a physical processing unit and a physical storage device, the computer system storing the database with K attributes in the physical storage device.

The term "index selection agent" is to be understood in the context of reinforcement learning. The invention is not limited to a particular implementation of the index selection agent. The index selection agent may base its decision on a Q-value (also referred to as "action-value methods", see chapter 9 of the text book by Sutton et al). But it may also base its decision on a parametrized policy (also referred to as "policy gradient methods", see chapter 13 of the text book by Sutton et al). According to a preferred embodiment, the index selection agent is based on Proximal Policy Optimization (PPO) [John Schulman, Filip Wolski, Prafulla Dhariwal, Alec Radford, and Oleg Klimov. 2017. Proximal Policy Optimization Algorithms. CoRR abs/1707.06347 (2017)]. PPO offers the advantage of adjusting the learning rate automatically. Correctly adjusting the rate stabilizes the learning process by avoiding drastic changes in the agent's behavior and improves overall performance.

FIG. 1 depicts an architectural overview of the entities involved in the index selection method according to a preferred embodiment. As part of the preprocessing, a user 1, e.g. a database administrator, specifies a set of representative queries 1, 2 . . . . N. Then, based on attributes of an input schema and a set of representative queries 1, 2 . . . . N, index candidates are generated (see 2). The set of representative queries 1, 2 . . . . N is also used for generating workloads (see 3) and a workload model 4, which is responsible for creating workload representations, i.e., transforming information about the queries 1, 2 . . . . N of the current workload to a numerical representation that can be passed to neural networks. As part of the training/application, an index selection environment retrieves a new workload for every training episode (see 5). Subsequently, costs and plans for every query of the current workload are requested from a what-if optimizer given the current index configuration (see 6). Then, action space required by an index selection agent is restricted to contain only actions that are valid for the environment's current state (see 7). For a state representation, the current state of the environment is translated to numerical features (see 8) so that it can be passed to the index selection agent. This process includes a retrieval of the workload representation from the workload model 4 (see 9). A state of the index selection environment and, if available, a reward are passed to the agent (see 10), which, in return, reacts with an action under consideration of the currently valid actions (see 11). After the environment implemented the agent's actions by creating indexes via the what-if utilities (see 12), the process is continued at 6 until there are no valid actions left, e.g. if the budget is exceeded or a user-specified maximum number of iterations has passed. After a configurable number of steps, the artificial neural network is updated to reflect the observations collected during the above steps.

Preferably, the method comprises a preprocessing phase, which involves determining at least one episodic workload, the episodic workload comprising queries. According to an embodiment, the queries contained in the episodic workload correspond to representative query classes. According to another embodiment, queries corresponding to all representative query classes are contained in the episodic workload. According to another embodiment, queries corresponding to only a subset of the representative query classes are contained in the episodic workload. According to a preferred embodiment, a new episodic workload is used for every training episode. Preferably, within one episode, the episodic workload is constant.

According to a preferred embodiment, representative query classes are specified. This may be part of the preprocessing phase. A frequency of occurrence may be assigned to each representative query class. This frequency may be a randomly or pseudo-randomly generated. This allows for variability and ensures that the index selection agent has to handle different query-frequency-pairs during training to anticipate a wide variety of workloads later during application. Preferably, the created workloads are split into training and test sets. The test set may contain only workloads that are not part of the training set. Besides, it is possible to specify that a certain number of the representative queries are not part of any training but only of test workloads to guarantee pure out-of-sample predictions. By doing so, it can be investigated whether the index selection agent is capable of generalizing to unknown queries and workloads.

Preferably, a workload model is determined. This may be part of the preprocessing phase. The workload model is responsible for creating workload representations, i.e., transforming information about the queries of the current workload to a numerical representation that can be passed to the index selection agent. This process is crucial because, the better the selected numerical representation, the better unknown queries can be handled.

According to a preferred embodiment, the preprocessing phase includes the step of determining a set of index candidates, preferably based on at least one of the set of representative queries and the input schema of the database. The index candidates may be both single-attribute indexes and multiple-attribute indexes. Preferably, the set of index candidates is restricted. Restricting the set of index candidates to relevant ones is crucial since index candidates correspond to the agent's actions, and too large action spaces complicate the agent's process of determining reasonable solutions and can increase training durations. At the same time, preferably, candidates are not limited so much that solutions of high quality cannot be determined. Preferably, not all but most attributes of the schema (and their permutations) are index candidates. According to a preferred embodiment, the index candidates comprise all indexes that are syntactically relevant (attributes that are relevant for the episodic workload considered) and all permutations thereof up to an admissible index width $W_{max}$ (the maximum number of attributes in a multiple-attribute index). Preferably, predictions of the index sizes for every index candidate based on the estimates of a what-if optimizer are determined.

The method further comprises a training phase. In the training phase, the index selection agent is trained in at least one episode. Preferably, the index selection agent is trained in multiple episodes. Even more preferably, the episodic workload is different for at least two or for each of the multiple episodes.

According to a preferred embodiment, in at least one episode, the index selection agent iteratively determines an index set based on an episodic workload for training purposes.

According to a preferred embodiment, the training phase includes the step of (a) determining a current state of an environment based on the episodic workload and a current index set. Initially, the current index set may be empty. But it may also contain certain single-attribute and/or multiple-attribute indexes, which, e.g., can be based on an educated guess of the database administrator.

Preferably, the determining of the current state of the environment is based on costs for at least one or all of the queries contained in the episodic workload given the current index set. The costs may be determined based on actual measurements or on estimates obtained from a what-if optimizer. While the latter option yields only estimates, it is faster than the first option. As state representations are preferably updated during training for each of the index selection agent's action, what-if-based estimations are preferred because the execution time of actual measurements may be prohibitive.

According to a preferred embodiment, the training phase includes the step of (b) taking an action from an action space based on the determined current state, wherein the action is adding an index candidate to the current index set. Preferably, adding an index candidate to the current index set may comprise an addition of a new single-attribute index or a new multiple-attribute index to the index set. In the latter case, the new multiple-attribute index may replace an index already existing in the index set.

According to a preferred embodiment, the training phase includes the step of (c) determining a reward based on the action taken. Preferably, a reward $r_t$ is determined for each action. But rewards can also be sparse. In the latter case, after some or even after many actions, the reward determined is zero. This is also intended to be covered by the term "determining a reward". In other words: step (c) does not need to be explicitly carried out in each iteration. It is sufficient if it is carried out in some of the iterations. Details about sparse rewards are explained in chapter 17.4 of the text book by Sutton et al. Rewards incentivize beneficial actions and guides the learning process. There are multiple options for building reward functions for index selection that could consider relative or absolute cost impacts of indexes, their storage consumption, and their validity. Absolute cost impacts have the disadvantage that these might largely differ for similar actions for different workloads and do not account for the required storage. For this reason, to consistently optimize the usage of storage in each state t, the additional relative benefit (reduction of workload costs, cf. Equation (1)) of an index selection $I_t^*$ per additional utilized storage is preferably used to determine the reward $r_t(I_t^*)$:

$$r_t(I_t^*) = \frac{(C(I_{t-1}^*) - C(I_t^*))/C(\emptyset)}{M(I_t^*) - M(I_{t-1}^*)}.$$

According to alternative embodiments of the invention, alternative reward functions are used. Further, if restricted action spaces are used, it is not necessary to punish invalid actions with negative rewards due to invalid action masking.

According to a preferred embodiment, the training phase includes the step of (d) repeating steps (a) to (c) until an end condition is met.

According to a preferred embodiment, the training phase also comprises the step of updating the index selection agent based on at least one of the current state determined, the action taken, and the reward determined during training. The step of updating may occur after every iteration of steps (a) to (c). It may also occur less frequently. Alternative updating strategies, as described, e.g., in the text book by Sutton et al, are covered by this invention as well.

According to a preferred embodiment, the index selection agent comprises a neural network and takes the action based on a computation of the neural network, wherein the input of the neural network is the state determined, in particular the state determined in step (b).

According to a preferred embodiment, the action space, from which the action is taken, is a restricted action space. The rationale is that there are states in which not all actions within the action space A are applicable, i.e., not all single-attribute or multiple-attribute indexes can be created, for instance, due to budget constraints. According to an alternative embodiment of the invention, such invalid actions are assigning large negative rewards. According to the preferred embodiment, however, the action space is restricted. In this approach, the index selection agent takes an action from a restricted action space. For example, the index selection agent receives the allowed actions as input and is structurally enforced to take an action from within this set. This technique shortens the learning process, as this element of the decision does not have to be represented within the agent's policy anymore. In addition, peak performance can be increased as well. Such efficiency considerations are essential if the overall action space consists of many actions but only few of these actions are allowed in a given state. Preferably, the action space determines how the agent can act, i.e., for the index selection problem, which indexes the agent can create. Formally, the action space can be regarded as a discrete action space A, where every action is adding a (single- or multi-attribute) index candidate. The existence of thousands of single- and multi-attribute index candidates is not rare for realistic workloads and datasets. Carefully designing and handling the action space is crucial for two reasons. (i) As stated above, the training efficiency depends on the number of available actions. For complex combinatorial problems, more available and dependent actions (index interaction) further complicate the problem. Simply limiting the index candidates a priori might reduce the size of the action space but can also negatively impact the quality of the determined index configurations. In addition, (ii) particular actions might be invalid in particular states. Comparable to the rules of chess where moving pawns across three squares is forbidden, the index selection process also follows specific rules: we can consider the repeated creation of an existing index or exceeding the storage budget as a breach of the rules. In RL, rules are usually enforced by large negative rewards to teach the agent the invalidity of certain actions. However, everything that must be learned can potentially increase the training duration and harm performance. Preferably, the action space is limited. This means that certain actions are invalid depending on a current state, thereby guiding the index selection agent to only consider a subset of all actions contained in the non-restricted action space. Preferably, valid actions are determined before the step of taking an action.

According to a preferred embodiment, the step of taking an action includes determining the restricted action space based on at least one of the current episodic workload, the remaining budget, or at least one previous action. Preferably, all of these criteria are taken into account.

According to a preferred embodiment, the step of taking an action includes determining the restricted action space based on at least one, preferably all, of the following criteria:
 (1) Index candidate irrelevant for workload. Preferably, it is checked for every index candidate whether it is syntactically relevant for the workload at hand, i.e., whether one or more of the index's attributes do not occur in the workload. Actions that include the addition of an index candidate that includes attributes that are irrelevant to the workload are determined as invalid.

(2) Index would exceed the budget. An addition of an index candidate that would lead to storage consumption that exceeds the storage budget is determined as invalid.

(3) Previous action(s). After choosing an action a, it is marked invalid such that it cannot be chosen again. Later, action a can be marked valid again, e.g., due to choosing actions that are associated with multi-attribute indexes.

(4) Invalid precondition. Before the first step, all multi-attribute indexes are masked as invalid. Only after the agent chose an index (X), all multi-attribute indexes with X as the first attribute, e.g., I(X, A); I(X, B) are made valid. This is based on the intuition that for a two-column index to be desirable, a single-column index on its leading column must also be desirable.

Figure 4:
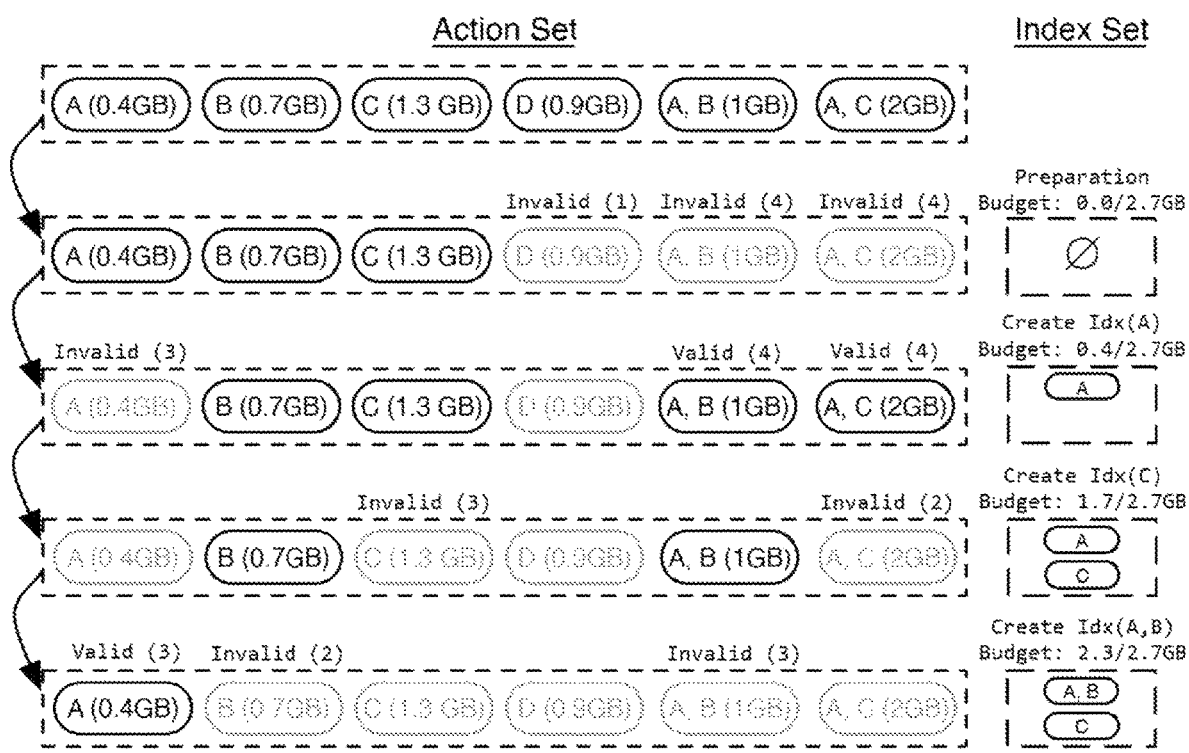
FIG. 4 depicts how the action space is restricted dynamically before every action taken.

An example of these four reasons for determining an action as invalid is shown in FIG. 4, which depicts how the system dynamically restricts the action space before every action taken. The action set is initially four single-attribute indexes (A), (B), (C), (D) and two multi-attribute indexes (A,B), (A,C). A budget of 2.7 GB is provided. First, the action set is restricted and three indexes (D), (A,B), (A,C) are invalid according to criteria (1) and (4). Next, the index (A) is invalid according to criteria (3), and the indexes (A,B), (A,C) are valid according to criteria (4); the occupied budget is 0.4 GB. Next, the index (C) is invalid according to criteria (3), and the index (A,C) is invalid according to criteria (2); the occupied budget is 1.7 GB. Finally, the index (A) is valid according to criteria (3), the index (B) is invalid according to criteria (2), and the index (A,B) is invalid according to criteria (3); the occupied budget is 2.3 GB.

According to a preferred embodiment, indexes may be created manually based on, e.g., domain knowledge or service-level agreements. For instance, these manually created indexes could be contained in the initial index set. Such manually created indexes can be made inaccessible for the model by determining actions affecting them as invalid.

According to a preferred embodiment, the state of the environment is represented by features, the features including at least one of: a representation of the current workload ("query representations" and "frequencies"), a representation of costs per query for at least one class of queries contained in the current workload with the current index configuration ("cost per query"), a representation of current storage consumption and budget given the current index configuration ("storage and cost"), a representation of the current index configuration.

Preferably, the number of features to represent a particular instance of the index selection problem largely depends on at least one of: the number of query classes in the workload, their complexity, and the number of indexable attributes.

Preferably, at least one of the "cost per query" and the "storage and cost" information contained in the state representation is based on actual measurements or on estimates obtained from a what-if optimizer. While the latter option yields only estimates, it is much faster. As state representations must be updated during training for each of the index selection agent's action, what-if-based estimations are preferred because actual execution time measurements may be impractical.

According to a preferred embodiment, the state of the environment is represented by three aspects: the episodic workload, meta information (e.g., budget), and the current index configuration.

Episodic workload representation: Different workloads may contain the same query classes, but their frequencies can differ. But different workloads may also contain different query classes. The episodic workload representation must reflect both cases. For an episodic workload with N query classes and a specified representation width of R (in FIG. 2, N=3, R=4), the episodic workload representation consists of (i) N numerical vectors of length R that represent the query classes' contents, (ii) a vector of length N with a numerical value for each query class' frequency, and (iii) another vector that contains the estimated execution cost per query class instance (N values) given the current index configuration. Representing the queries' contents is beneficial because it allows to agent to learn about the structure of queries in the episodic workload, recognize similarities, and, in the end, generalize to unknown queries. Even though the neural network structure may be fixed, an index selection agent that was trained with episodic workload size N can always be utilized to determine index configurations even if the episodic workload size is different, e.g., $\tilde{N}$, during inference time. If $\tilde{N}<N$, padding can be applied, i.e., query representation, frequency, and cost per query are set to 0 for $N-\tilde{N}$ queries. Otherwise, if $\tilde{N}>N$, a representative set of the episodic workload with size N must be created. Such a set can always be found, e.g., by focusing on the most relevant queries and summarizing similar queries; episodic workload compression has been effectively used for index selection in the past [Surajit Chaudhuri, Ashish Kumar Gupta, and Vivek R. Narasayya. 2002. Compressing SQL workloads. In Proceedings of the International Conference on Management of Data (SIGMOD). 488-499; Shaleen Deep, Anja Gruenheid, Paraschos Koutris, Jeffrey F. Naughton, and Stratis Viglas. 2020. Comprehensive and Efficient Workload Compression. PVLDB 14, 3 (2020), 418-430]. Preferably, query clustering is applied to reduce the total query count [Lin Ma, Dana Van Aken, Ahmed Hefny, Gustavo Mezerhane, Andrew Pavlo, and Geoffrey J. Gordon. 2018. Query-based Workload Forecasting for Self-Driving Database Management Systems. In Proceedings of the International Conference on Management of Data (SIGMOD). 631-645]. Preferably, N is chosen to be sufficiently large so that the need for workload compression can be avoided altogether or, at least, decrease the possible information loss caused by it. Further preferably, N is chosen sufficiently small in order to reduce complexity.

Figure 3:
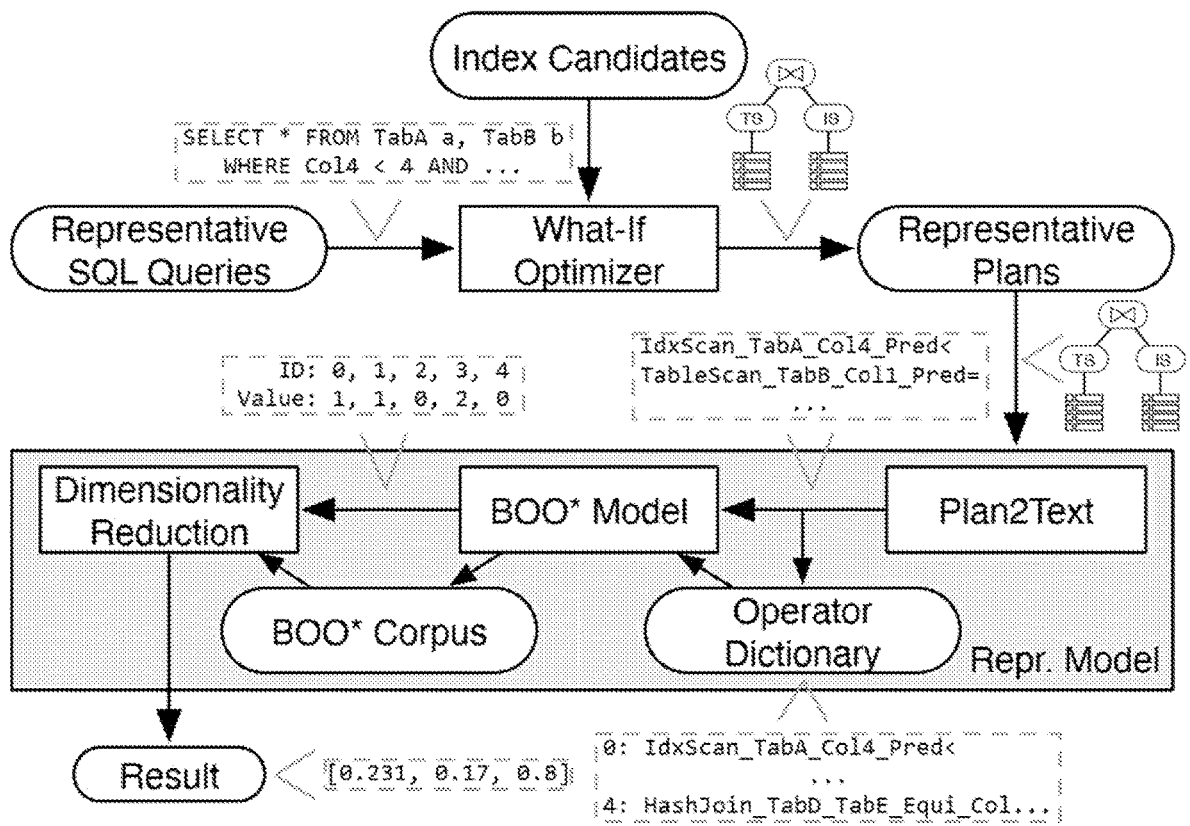
FIG. 3 depicts how workload representation model is built according to a preferred embodiment.

Preferably, the trained index selection agent is able to handle actual workloads that were not part of the training workloads. Of course, these actual workloads should not differ entirely but be reasonably similar to the episodic workload used during training. Thus, preferably, the set of training queries should roughly capture the workload expected at application time. In order to handle unknown queries it is preferable if details of the queries must be encoded such that the agent can incorporate them into its decision making. Hence it is advantageous if a detailed representation of the workload and its queries is part of the state representation. Preferably, this representation is compact enough to avoid feature explosion and contains enough detail to distinguish queries properly. Further preferably, the task of creating the representation should not be too complex as it would further increase training durations. An example of how episodic workload can be represented in accordance with the invention is shown in FIG. 3. According to this example, representative plans are built from the set of representative queries by utilizing the what-if optimizer and index candidates. For every query, the what-if optimizer is repeatedly invoked to generate various plan alternatives based on different index configurations. Theoretically, the query representation could be built entirely on the queries' SQL strings, but execution plans contain more details, information about index usage and might change with the agent's actions, i.e., index decisions. The representative plans are passed to the representation model. The operators of every plan that are relevant for index selection are transformed into a text representation. For example, under the presence of an index on TabA.Col4 a text representation IdxScan_TabA_Col4_Pred<might be generated. The text representations for all representative plans are stored in the operator dictionary, which assigns an ID to every distinct operator's text representation. These IDs are used in the next step to construct a Bag Of Operators (BOO), i.e., a numerical representation of the operators of a query. The BOO could be made part of the state representation. However, using the BOO without further processing would result in many additional, very sparsely populated features per query. The number of distinct relevant operators, which would need to be incorporated for every query of the workload, i.e., N times, can be large. Consequently, a dimensionality reduction step is applied. Based on the BOO representations of all representative plans, a Latent Semantic Indexing model is built to reduce the feature count. Experimentally, a representation width (R) of 50 has proven to be sufficient for the evaluated workloads. Other approaches, e.g., random projections or principal component analysis, could also be used to reduce dimensionality.

Meta information: Meta information preferably contains four scalar features regarding storage and workload cost: (i) a value for the currently specified storage budget (B), (ii) the current storage consumption based on the what-if optimizer's index size predictions, and (iii) the initial (without any indexes) and (iv) current cost (C) for executing the episodic workload, cf. Equation (1).

Current index configuration: The current index configuration encodes for every indexable attribute as to whether an index is present or not. In the simplest case, with a maximum index width of $W_{max}=1$ (i.e. only single-attribute indexes), this information can be represented by a binary vector as every index can exist once or not at all. Encoding the index configuration is more challenging if multi-attribute indexes are admitted ($W_{max}>1$) because there can be millions of index candidates. According to one embodiment, a binary vector as above is used nonetheless. However, this increases the number of (very sparsely populated) features by the number of index candidates. According to another embodiment, $W_{max}$ is limited to a threshold. However, decreasing the dimensionality by limiting the number of candidates is problematic because this leads to a loss in performance. Therefore, according to a preferred embodiment, the information is encoded on the current index configuration for each indexable attribute separately to avoid large feature spaces. This means that the current index configuration vector preferably comprises a separate value for each attribute. Further preferably, the value corresponding to an attribute is incremented by 1/p for every index that contains the said attribute. p refers to the position in the index. For example, for Idx(I_cdate, I_rdate) I_cdate's p is 1 and I_rdate's p is 2. If a further index Idx(c1, c2, c3, I_cdate) would exist, I_cdate's vector value would be 1.25=1+¼. Representing the current index configuration in such a way—in contrast to a binary vector—implicates some loss of information: instead of encoding which exact indexes exist, it is encoded to which degree attributes are covered by indexes. In experiments, it was observed that this encoding leads to sufficient index selections. In addition, the index selection environment still maintains the full information that is, e.g., beneficial for applying restriction of the action space.

Figure 2:
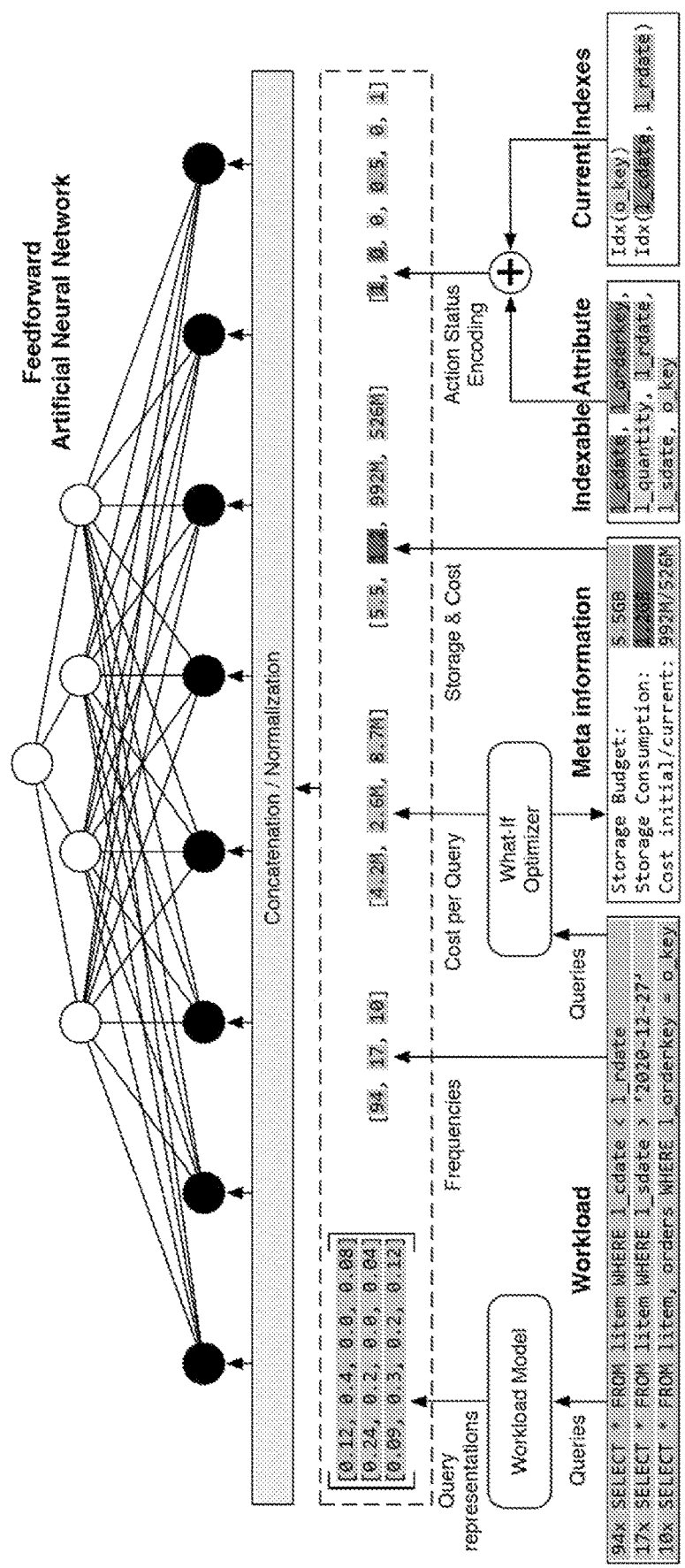
FIG. 2 shows how the state of an environment is represented by 28 features distributed over 7 vectors according to a simplified use case of an embodiment.

According to an exemplary embodiment of the invention, the state is represented as shown in FIG. 2. In this example with a simplified workload, there are 28 features distributed over 7 vectors. The workload has three queries. The workload model generates three respective query representations from the three queries, with each query representation being a vector with four features. The workload also has a vector of three respective frequencies for the three queries. The what-if optimizer generates a three-feature vector of cost per query and meta information based on the queries, represented by a four-feature vector of storage and cost. The indexable attributes and current indexes are combined, resulting in a six-feature vector of the action status encoding. Concatenation and normalization are performed on the 7 vectors, with the results being provided to a feedforward artificial neural network.

Concatenation and normalization. Preferably, before the state information is passed to the index selection agent, the vectors are concatenated, and the contents are normalized so that values X are normalized to $\tilde{X}$ using their moving average $\overline{X}$ and the variance $\sigma^2$ as follows ($\varepsilon:=10^{-8}$ prevents possible divisions by zero):

$$\tilde{X}=(X-\overline{X})/(\sigma^2(\overline{X})+\varepsilon)^{0.5}.$$

The process described herein may be characterized in that the end condition is at least one of an index storage consumption exceeding a storage budget, a predefined maximum number of construction steps being reached, a predefined maximum number of indexes being reached, and no or no significant further improvement being achieved by adding an index candidate to the current index set.

According to a preferred embodiment, to prevent overfitting, the index selection agent's performance is monitored at periodic intervals during training, e.g. every few thousand steps or every n episodes. If the moving average of the performance stops improving, the training may be stopped.

According to a preferred embodiment, after training, the trained index selection agent is applied to an actual workload. Starting with an empty or a predetermined index set, the index selection agent iteratively adds indexes with the highest estimated reward until the end condition is met (e.g. the end conditions mentioned above). Advantageously, this method is fast and can be applied to previously unseen workloads by using a function approximator (e.g. an artificial neural network).

Figure 5:
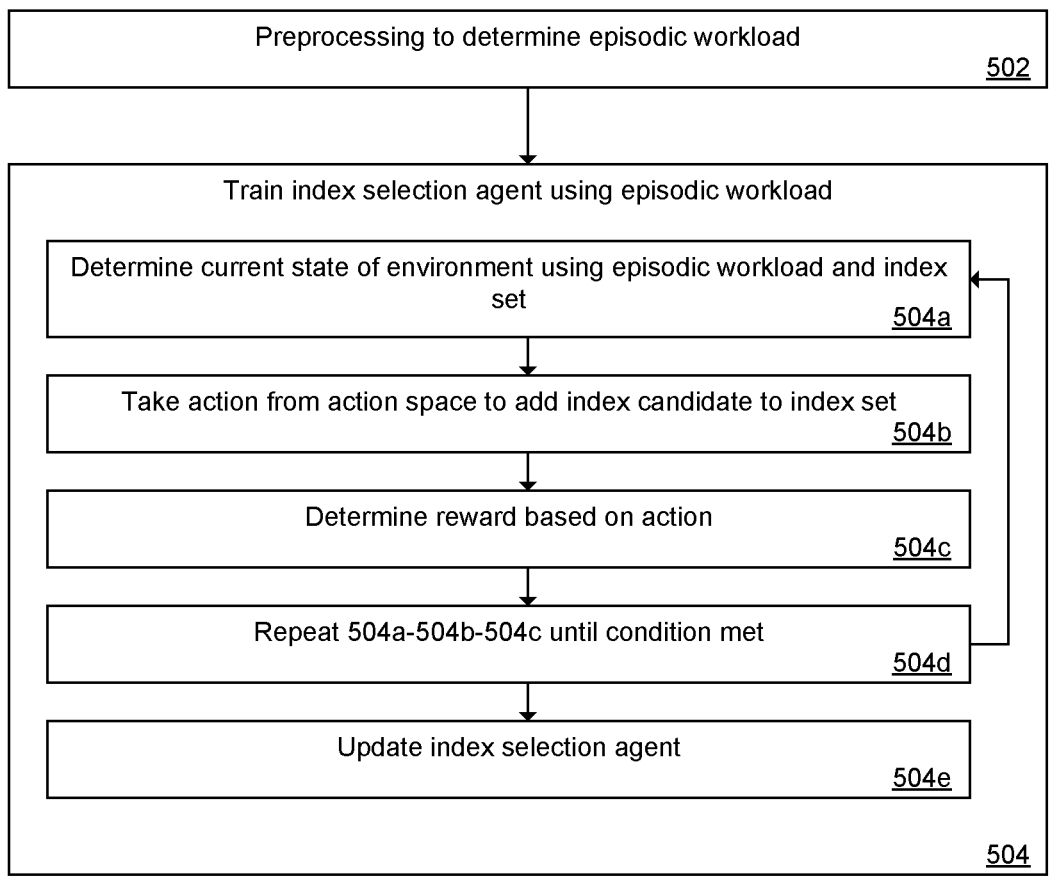
FIG. 5 is a flow diagram of a method of training an index selection agent, according to an embodiment.

FIG. 5 is a flow diagram of a method 500 for training an index selection agent. The method 500 may be performed by one or more computer systems, for example by executing one or more computer programs to control the operation of each computer system.

At 502, preprocessing is performed to determine at least one episodic workload. The episodic workload includes queries. For example, the computer system may implement preprocessing as described above with reference to the preprocessing phase and to the preprocessing shown in FIG. 1, implementing features such as the representative queries, the schema, the what-if optimizer, etc.

At 504, an index selection agent is trained in at least one episode of the episodic workload (see 502). For example, the computer system may implement training as described above with reference to the training phase and to training of FIG. 1, implementing features such as the valid actions, the action space restriction, and the index selection environment. The index selection agent may include a neural network implemented by the computer system, as discussed above. Training the index selection agent in the episode includes phases 504a, 504b, 504c, 504d and 504e.

At 504a, a current state of an environment is determined based on the episodic workload (see 502) and a current index set. For example, the computer system may determine the current state of the environment as described above with reference to step (a) of the training phase.

At 504b, an action is taken from an action space based on the current state determined in 504a. The action adds an index candidate to the current index set (see 504a). For example, the computer system may take an action from the action space as described above with reference to step (b) of the training phase.

At 504c, a reward is determined based on the action taken in 504b. For example, the computer system may determine the reward as described above with reference to step (c) of the training phase.

At 504d, the steps 504a, 504b and 504c are repeated until an end condition is met. For example, the computer system may iteratively perform steps 504a, 504b and 504c to increase the elements of the current index set by adding the index candidates.

At 504e, the index selection agent is updated based on at least one of the current states determined in 504a, the actions taken in 504b, and a set of rewards determined during training. For example, the computer system may update the index selection agent after every iteration (or less frequently), or by using an alternative updating strategy, as discussed above.

The method 500 may include additional steps or substeps, in order to implement other features of the preprocessing phase, the training phase, etc. as described above.

Once the index selection agent has been trained, additional method steps may be performed, such as generating an index set, executing a query on the database using the index set, etc.

A second aspect of an embodiment relates to a computer system, including a processor and a memory, configured for carrying out the method described herein.

FIG. 6 is a block diagram of an example computer system 600 and network for implementing embodiments of the present invention. A computer system 610 includes a bus 605 or other communication mechanism for communicating information, and a processor 601 coupled with a bus 605 for processing information. The computer system 610 also includes a memory 602 coupled to bus 605 for storing information and instructions to be executed by processor 601, including information and instructions for performing the techniques described above. This memory may also be used for storing temporary variables or other intermediate information during execution of instructions to be executed by the processor 601. Possible implementations of this memory may be, but are not limited to, random access memory (RAM), read only memory (ROM), or both. A storage device 603 is also provided for storing information and instructions. Common forms of storage devices include non-transitory computer-readable media such as a hard drive, a magnetic disk, an optical disk, a CD-ROM, a DVD, a flash memory, a USB memory card, or any other medium from which a computer can read. The storage device 603 may include source code, binary code, or software files for performing the techniques or embodying the constructs above, for example. The computer system 610 may be a desktop computer, a laptop, a server computer, or any other type of computer system or combination thereof.

The computer system 610 may be coupled via the bus 605 to a display 612, such as a liquid crystal display (LCD), for displaying information to a computer user. An input device 611 such as a keyboard and/or mouse is coupled to the bus 605 for communicating information and command selections from the user to the processor 601. The combination of these components allows the user to communicate with the system. In some systems, the bus 605 may be divided into multiple specialized buses.

The computer system 610 also includes a network interface 604 coupled with the bus 605. The network interface 604 may provide two-way data communication between the computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, the network interface 604 sends and receives electrical, electromagnetic, or optical signals that carry digital data streams representing various types of information.

The computer system 610 can send and receive information, including messages or other interface actions, through the network interface 604 to an Intranet or the Internet 630. In the Internet example, software components or services may reside on multiple different computer systems 610 or servers 615, 631, 632, 633, 634 and 635 across the network. A server (e.g., the server 631) may transmit actions or messages from one component, through the Internet 630, the local network 620, and the network interface 604 to a component on the computer system 610. A server (e.g., the server 615) may include a processor, a memory, and other components similar to those of the computer system 610.

The computer system 600 may implement a cloud computing system that includes one or more of the computer system 610 and the servers 615, 631-635. The computer system 600 may implement various aspects of the embodiments described above, such as storing the database, storing the index selection agent, storing the index set, executing the preprocessing phase to generate the episodic workload, executing the training phase to train the index selection agent, executing processes to perform the method 500 (see FIG. 5), etc. The computer system 600 may execute queries on the database using the index set having been trained by the index selection agent.

A third aspect of an embodiment relates to a non-transitory computer program product comprising instructions which, when the program is executed by a computer, cause the computer to carry out the steps of the method described herein.

Exemplary Implementation

The method for training an index selection agent was implemented on a computer system with an AMD EPYC 7F72 with 24 cores. The indexes can be implemented as non-covering B-trees, the default index type of PostgreSQL. Certain embodiments are not limited to a particular hardware type or index type.

The database system can be implemented using PostgreSQL and HypoPG for what-if optimization. Other database systems may be used as well.

For the implementation of the index selection agent Stable Baselines versions 2 and 3 that rely on Tensorflow, respectively PyTorch, may be used. The agent may be implemented to interact with a database environment using OpenAi's gym interface.

The above description illustrates various embodiments along with examples of how aspects of the present disclosure may be implemented. The above examples and embodiments should not be deemed to be the only embodiments, and are presented to illustrate the flexibility and advantages of embodiments as defined by the following claims. Based on the above disclosure and the following claims, other arrangements, embodiments, implementations and equivalents will be evident to those skilled in the art and may be employed without departing from the spirit and scope of this disclosure as defined by the claims.

The invention claimed is:

1. A method for training an index selection agent for iteratively determining an index set I to be used when running queries against a database, the method being implemented in a computer system with a physical processing unit and a physical storage device, the computer system storing the database with K attributes in the physical storage device, the method comprising the following phases:
   (1) preprocessing, wherein the preprocessing comprises determining at least one episodic workload, the episodic workload comprising queries;
   (2) training, by the computer system, the index selection agent in at least one episode, wherein training the index selection agent in an episode comprises following steps:
      (a) determining a current state of an environment based on the episodic workload and a current index set,
      (b) taking an action from an action space based on the determined current state, wherein the action is adding an index candidate to the current index set,
      (c) determining a reward based on the action taken,
      (d) repeating steps (a) to (c) until an end condition is met,
   wherein the phase of training the index selection agent further comprises the step of updating, by the computer system, the index selection agent based on at least one of the current states determined, the actions taken, and a set of rewards determined during training,
   wherein determining the at least one episodic workload comprises:
      generating, by the computer system, a representative plan using a set of index candidates and a set of representative queries; and
      generating, by the computer system, the episodic workload using the representative plan, wherein generating the episodic workload includes constructing a numerical representation of one or more operators in the set of representative queries used to generate the representative plan, and
   wherein the index selection agent comprises an artificial neural network, wherein an input of the artificial neural network is the numerical representation of the one or more operators.

2. The method of claim 1 wherein the step of determining of the current state of the environment is based on costs for at least one of the queries contained in the episodic workload given the current index set, wherein said costs are estimated using a what-if optimizer.

3. The method of claim 1 wherein the action space, from which the action is taken, is a restricted action space.

4. The method of claim 3 wherein the step of taking an action includes determining the restricted action space based on at least one of the current episodic workload, a storage budget, and at least one previous action taken by the index selection agent.

5. The method of claim 1 wherein the state of the environment is represented by features, the features including at least one of:
   a representation of the episodic workload,
   a representation of costs per query for at least one class of queries contained in the episodic workload with the current index configuration,
   a representation of a current storage budget and consumption with the current index configuration, and
   a representation of the current index configuration.

6. The method of claim 1 wherein the state of the environment is represented by features relating to three aspects: the episodic workload, meta information, and the current index configuration.

7. The method of claim 6 characterized in that the meta information relates to a current storage consumption, a storage budget, an initial cost for executing the episodic workload, and a current cost for executing the episodic workload.

8. The method of claim 1 wherein the reward is determined based on an additional relative reduction of workload costs of an index selection per additional utilized storage.

9. The method of claim 1 wherein the end condition is at least one of: an index storage consumption exceeding a storage budget, a predefined maximum number of construction steps being reached, a predefined maximum number of indexes being reached, and no or no significant further improvement being achieved by adding an index candidate to the current index set.

10. The method of claim 1 wherein preprocessing includes the step of determining a set of index candidates.

11. The method of claim 1 wherein the index selection agent takes the action based on a computation of the artificial neural network, wherein a second input of the artificial neural network is the state determined in step (a) of claim 1.

12. The method of claim 1, further comprising:
   determining, by the computer system, the index set I using the index selection agent that results from the end condition having been met; and
   storing, by the computer system, the index set I determined by the computer system.

13. The method of claim 12, further comprising:
   executing, by the computer system, a new query against the database using the index set I determined by the computer system using the index selection agent; and
   outputting, by the computer system, a result of executing the new query.

14. The method of claim 1, wherein the queries in the episodic workload correspond to one or more representative query classes.

15. The method of claim 14, wherein each of the one or more representative classes has a corresponding frequency of occurrence, wherein each frequency of occurrence is generated such that the index selection agent handles different query-frequency pairs.

16. The method of claim 1, wherein the episodic workload includes a first set of workloads and a second set of workloads, wherein each workload in the first set of workloads has a same set of query classes with a first set of different frequencies, and wherein each workload in the second set of workloads has a different set of query classes with a second set of different frequencies.

17. The method of claim 1 wherein the artificial neural network comprises a feedforward artificial neural network.

18. The method of claim 1 wherein constructing the numerical representation of the one or more operators includes performing dimensionality reduction on the numerical representation of the one or more operators.

19. A computer system for training an index selection agent for iteratively determining an index set I to be used when running queries against a database, the computer system comprising:
- a memory, wherein the memory is configured to store the database with K attributes in a physical storage device; and
- a processor, wherein the processor is configured to control the computer system to execute a method comprising:
  (1) preprocessing, wherein the preprocessing comprises determining at least one episodic workload, the episodic workload comprising queries;
  (2) training, by the computer system, the index selection agent in at least one episode, wherein training the index selection agent in an episode comprises following steps:
    (a) determining a current state of an environment based on the episodic workload and a current index set,
    (b) taking an action from an action space based on the determined current state, wherein the action is adding an index candidate to the current index set,
    (c) determining a reward based on the action taken,
    (d) repeating steps (a) to (c) until an end condition is met,
  wherein the phase of training the index selection agent further comprises the step of updating, by the computer system, the index selection agent based on at least one of the current states determined, the actions taken, and a set of rewards determined during training,
  wherein determining the at least one episodic workload comprises:
    generating, by the computer system, a representative plan using a set of index candidates and a set of representative queries; and
    generating, by the computer system, the episodic workload using the representative plan, wherein generating the episodic workload includes constructing a numerical representation of one or more operators in the set of representative queries used to generate the representative plan, and
  wherein the index selection agent comprises an artificial neural network, wherein an input of the artificial neural network is the numerical representation of the one or more operators.

20. A non-transitory computer-readable medium, comprising instructions which, when executed by a computer system, cause the computer system to carry out a method comprising:
  (1) preprocessing, wherein the preprocessing comprises determining at least one episodic workload, the episodic workload comprising queries;
  (2) training, by the computer system, the index selection agent in at least one episode, wherein training the index selection agent in an episode comprises following steps:
    (a) determining a current state of an environment based on the episodic workload and a current index set,
    (b) taking an action from an action space based on the determined current state, wherein the action is adding an index candidate to the current index set,
    (c) determining a reward based on the action taken,
    (d) repeating steps (a) to (c) until an end condition is met,
  wherein the phase of training the index selection agent further comprises the step of updating, by the computer system, the index selection agent based on at least one of the current states determined, the actions taken, and a set of rewards determined during training,
  wherein determining the at least one episodic workload comprises:
    generating, by the computer system, a representative plan using a set of index candidates and a set of representative queries; and
    generating, by the computer system, the episodic workload using the representative plan, wherein generating the episodic workload includes constructing a numerical representation of one or more operators in the set of representative queries used to generate the representative plan, and
  wherein the index selection agent comprises an artificial neural network, wherein an input of the artificial neural network is the numerical representation of the one or more operators.

* * * * *